(No Model.)

G. H. WELLS, Jr.
ANIMAL TRAP.

No. 462,343. Patented Nov. 3, 1891.

Witnesses
A. O. Babendreier
H. F. Riley

Inventor
George H. Wells, Jr.
By his Attorneys,
C. A. Snow & Co.

United States Patent Office.

GEORGE HENRY WELLS, JR., OF LAKE CHARLES, LOUISIANA, ASSIGNOR OF ONE-HALF TO SOLOMON BLOCH, OF SAME PLACE.

ANIMAL-TRAP.

SPECIFICATION forming part of Letters Patent No. 462,343, dated November 3, 1891.

Application filed June 3, 1891. Serial No. 394,944. (No model.)

*To all whom it may concern:*

Be it known that I, GEORGE HENRY WELLS, Jr., a citizen of the United States, residing at Lake Charles, in the parish of Calcasieu and State of Louisiana, have invented a new and useful Rat-Trap, of which the following is a specification.

The invention relates to improvements in animal-traps.

The object of the present invention is to simplify and improve the construction of traps for small animals, such as rats and the like, lessen the cost of construction, and enable them to be packed in a small space for shipping.

The invention consists in the construction and novel combination and arrangement of parts hereinafter fully described, illustrated in the accompanying drawings, and pointed out in the claims hereto appended.

Figure 1:
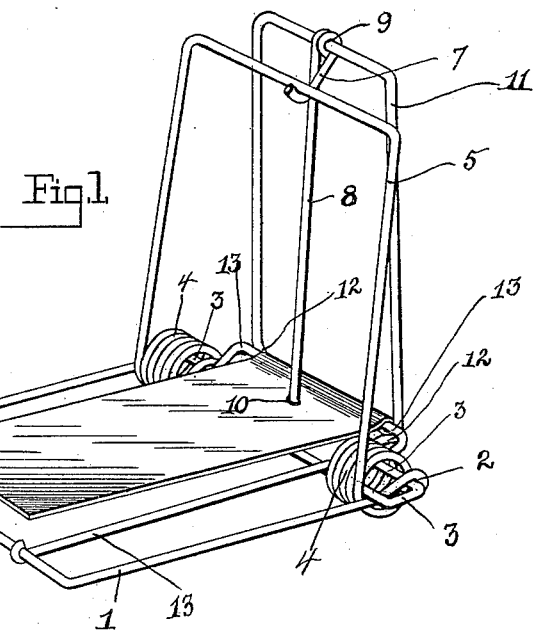
Figure 2:
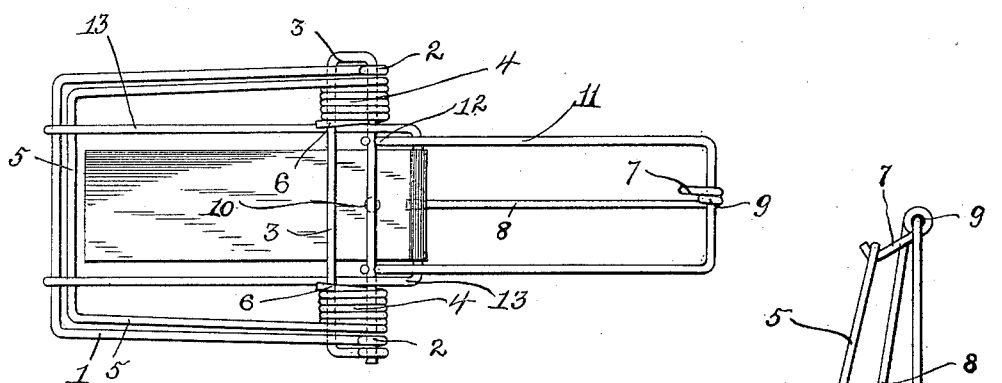
Figure 3:
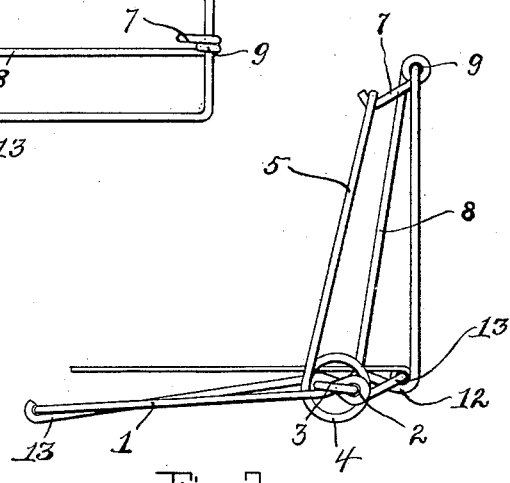

In the drawings, Figure 1 is a perspective view of an animal-trap constructed in accordance with this invention and shown set. Fig. 2 is a reverse plan view, partly in section. Fig. 3 is a longitudinal sectional view.

Referring to the accompanying drawings, 1 designates a wire base approximately U-shaped and provided at its ends with eyes 2, in which is secured one side of a rear brace 3, which is transversely disposed and is constructed of wire and is approximately rectangular, and is arranged at the rear of the trap and supports the coils 4 of a spring-actuated striking-wire 5. The striking-wire 5 is U-shaped and conforms to the configuration of the base 1, and is arranged within the same when the trap is sprung and has its sides and front parallel with those of the base, and it is provided at its ends with the coils 4. The coils extend inward from the sides of the striking-wire and are arranged on the parallel sides of the rear brace 3, and their inner ends 6 pass between the sides of the brace and engage the same and prevent the coils turning when the striking-wire is raised to set the trap.

The striking-wire is held above the base when the trap is set by an arm 7 of a wire trigger 8, which has its arm 7 arranged at an angle and bent at the end to prevent the striking-wire accidentally slipping and springing the trap, and it is provided at its angle with an eye 9, forming a bearing. The wire trigger engages a perforation 10 of a bait-pan, which is hinged at the rear of the frame and extends to the front thereof and is adapted to hold a bait and to be depressed by an animal to release the lower end of the trigger-wire and spring the trap. The trigger is mounted on a trigger-frame 11, which is U-shaped and has its ends 12 bent at an angle and provided with eyes and arranged on the rear side of the brace 3, and is adapted to assume a vertical position when the trap is set, as illustrated in Fig. 1 of the accompanying drawings, and to be folded down, as illustrated in Figs. 2 and 3, and when it is in a vertical position it is prevented being thrown forward by a longitudinal brace 13, which acts as a stop.

The longitudinal brace is U-shaped and has its ends secured to the front of the base, and its sides pass between sides of the transverse brace and the cross-piece is arranged back of the transverse brace and serves as a pintle for hinging the bait-pan, which is provided with a transverse eye formed by bending the end of the bait-pan on itself.

The transverse brace and the longitudinal brace serve to prevent the coils spreading and losing their strength.

It will be seen that the trap is simple and inexpensive in construction, effective in operation, and is adapted to be folded in a small space for transportation.

The frame of the trap shown and described is constructed like that shown in another application filed by me this day and disclosing a trap constructed especially for moles and similar burrowing animals.

What I claim is—

1. An animal-trap comprising the U-shaped base constructed of wire and provided at its ends with eyes, the transverse brace constructed of wire and having parallel sides, one of which engages the said eyes, the longitudinal U-shaped brace constructed of wire and having its sides secured to the base and passing between the sides of the transverse brace and having its cross-piece arranged back of the same, the bait-pan hinged to the longitudinal brace and extending to the front of the frame, the trigger-frame hinged to the transverse brace, the wire trigger mounted on the trigger-frame and arranged to engage the bait-pan, and the U-shaped striking-wire provided at its ends with coils arranged on the transverse base, substantially as described.

2. An animal-trap comprising the U-shaped base, the rectangular transversely-disposed brace constructed of wire and secured to the base, the longitudinal U-shaped brace having its ends secured to the base and passing between the sides of the transverse brace, with its cross-piece arranged back of the same, the U-shaped trigger-frame having its ends bent at an angle and provided with eyes and hinged to the transverse brace and being arranged to engage the longitudinal brace, the bait-pan hinged to the cross-piece of the longitudinal brace and extending to the front of the frame and provided with a perforation, the trigger mounted on the trigger-frame and arranged to engage the perforation of the bait-pan, and the U-shaped striking-wire having coils at its ends arranged on the transverse brace and having their ends arranged between the sides of the transverse brace, substantially as described.

3. An animal-trap comprising the U-shaped base constructed of wire and provided at its ends with eyes, the transverse brace constructed of wire and having parallel sides, one of which engages said eyes, the longitudinal U-shaped brace constructed of wire and having its sides secured to the base and passing between the sides of the transverse brace and having its cross-piece arranged back of the same, the trigger-frame hinged to the transverse brace, the wire trigger mounted on the trigger-frame, the U-shaped striking-wire provided at its ends with coils arranged on the transverse base, and means for setting and springing the striking-wire, substantially as described.

In testimony that I claim the foregoing as my own I have hereto affixed my signature in presence of two witnesses.

GEORGE HENRY WELLS, JR.

Witnesses:
E. G. SIGGERS,
J. A. SAUL.